April 17, 1951 B. U. RYLANDER 2,548,910
METHOD OF MANUFACTURING CLICKER DIES
Filed March 18, 1949
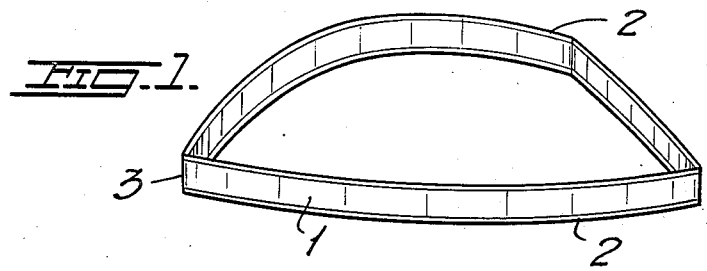
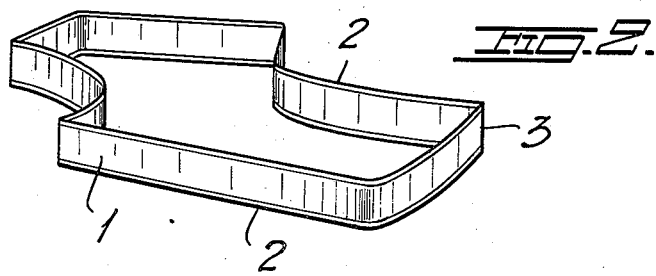
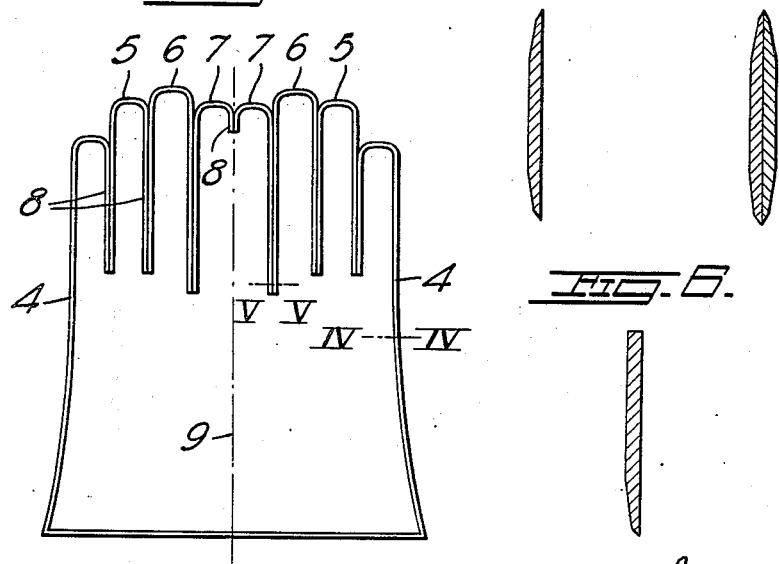
Inventor
Bernard Uno Rylander
by Sommers & Young
Attorneys Patented Apr. 17, 1951

2,548,910

UNITED STATES PATENT OFFICE 2,548,910

METHOD OF MANUFACTURING CLICKER DIES

Bernhard Uno Rylander, Enskede, Sweden, assignor to Svenska Skofabriksntforeningen, Stockholm, Sweden, an association of shoe manufacturers Application March 18, 1949, Serial No. 82,142
In Sweden April 1, 1948

3 Claims. (Cl. 76—107)

The present invention relates to a method of manufacturing cutting dies for cutting blanks from leather, skin, stuff, paper or the like, in which a steel strip is provided with a cutting-edge at one or both of its longitudinal edges and bent and at end parts joined together to a closed configuration corresponding to the outline desired of the blanks to be cut.

The method according to the present invention consists therein that the strip is hardened and ground to form a cutting edge or edges before bending and is bent cold to the desired configuration, whereby the strip is given such stability that it without the necessity of being attached to a supporting core, maintains its shape or take it again after possible temporary lateral deformation.

In the accompanying drawing two embodiments of the invention are illustrated.

Fig. 1 shows a die for cutting a leather blank adapted to be used as toe-cap on a shoe. Fig. 2 shows a die for cutting a leather blank adapted to be used as upper adjacent to a toe-cap on a shoe. Fig. 3 is a plan view of a die for cutting a glove blank. Figs. 4 and 5 show in larger scale a cross section along the lines IV—IV respectively in Fig. 3, the tool being provided with two cutting edges to make it possible to use the die for cutting blanks both for right and left gloves. Fig. 6 shows a cross section through a die provided with a single cutting edge.

According to the embodiment shown in Figs. 1 and 2 the cutting die consists of a hardened thin steel strip 1 provided with a cutting edge 2 at each of its longitudinal edges, the cutting edges being exactly parallel to each other. Thereupon the steel strip has been bent cold to a closed configuration corresponding to the outline desired of the blanks to be cut, thus according to Fig. 1 a toe-cap and according to Fig. 2 an upper part adjacent the toe-cap. The bending of the steel in cold state is important in order to avoid dehardening of the hardened steel strip and thereby a troublesome regrinding of the cutting edges. The cold bending of the hardened strip to the desired configuration is permitted thereby that the strip at each bending point is subjected to a series of closely spaced lines of bending. After bending the strip to the mentioned configuration its ends are joined together by welding, riveting or the like, for instance at a corner or on a straight portion.

For cutting the blanks the material, from which the blanks are to be cut, is placed on a table, whereupon the dies are placed on the material in suitable manner for saving material. Thereupon a pressure by means of a press piston is applied on the dies, so that they are forced through the leather or the like and the blanks are cut. In order not to damage the upper cutting edge of the die the pressing face of the piston is covered with a relatively soft material, for instance aluminium. The advantage of a cutting edge at both of the strip edges consists therein that one and the same die may be used for cutting blanks, for instance for left and right shoes or for both sides of a shoe by turning one or the other cutting edge of the die downwards.

Since the height of the die is exactly the same at all points the supporting table upon which the dies operate may be considerably harder than wood in tables hitherto used for said operation, which frequently must be surface ground. For instance, aluminium tables may be used, by which a considerable reducing of the grinding may be obtained. Dies manufactured according to the present invention are relatively light and have no tendency to scratch the leather unlike the known dies for the like operations.

The dies manufactured according to the invention may of course be used for cutting other materials than leather, for instance skin, stuff, cardboard etc.

In the embodiment shown in Figs. 3 to 6 the die is constructed of several parts of a hardened thin steel strip, which parts are bent to the desired outline of the blank. In hitherto known dies of this type the cutting edge has been so positioned that at such places in which it is desired that the cutting edges of two die portions, which have two sides close to each other, should coincide to one cutting edge, it has been necessary by welding or the like to join a special member at the meeting place of the two die parts. The welding joint has caused larger or smaller traces in the edge of the blank, and therefore it has been necessary after the cutting operation to trim the edges of the blank, which is a time-consuming operation. The object of the embodiment shown in Figs. 3 to 6 is to eliminate said disadvantages and to simplify the manufacturing of dies of said type.

For this purpose the die according to the last mentioned embodiment is constructed from two or more parts of a hardened, thin steel strip, which parts are bent to the desired outline of the blank, each of said parts having a cutting edge positioned in the same plane as a plane side of the strip part, the strip parts being positioned to each other in such manner that the cutting edges of each pair of strip parts, which at their plane sides are welded to each other, coincide in a common line.

Consequently the die is constructed from several parts 4 to 7 of a hardened, thin steel strip, which parts are bent to the desired configuration of the blank. Figs. 4 to 6 (in which the thickness of the strip is shown in exaggerated scale) shows that each of the parts 4 to 7 at each of the edges (Figs. 4 and 5) or at one of the edges (Fig. 6) has a cutting edge positioned in the plane of a plane side of the strip part. The strip parts 4 to 7 are positioned in such manner to each other that the cutting edges of each pair of longitudinal parts 8 (Fig. 3) welded with their plane sides to each other coincide in a common line, as shown in Fig. 5. In other parts of the die the plane side of the strip parts is turned outwards.

As shown in Fig. 3 the die is symmetric relatively to a center line 9, so that the outer and inner part of the glove are cut in one piece.

What I claim is:

1. A method of manufacturing cutting dies for cutting blanks from leather, skin, stuff, paper and the like, which includes the steps of grinding the longitudinal edges of a plurality of hardened thin steel strips to form a bevelled cutting edge on the strips so that each edge lies in the same plane as a plane side of the strip, bending the hardened strips to the desired outline of the blank to be cut, positioning the cutting edge of each of the strips so that at least a portion of the cutting edges of a pair of strips coincide in a common line, and thereafter welding the pair of strips together.

2. A method of manufacturing cutting dies for cutting blanks from leather, skin, stuff, paper or the like, which includes the steps of grinding the longitudinal edge or edges of a hardened steel strip to form a bevelled cutting edge or edges, thereafter bending the hardened strip to a closed configuration corresponding to the outline desired of the blanks to be cut, and joining the ends of the strip together, whereby the strip is given such stability that it will, without the necessity of being attached to a supporting core, maintain its shape or take it again after possible lateral temporary deformation.

3. A method as set forth in claim 2 wherein said bending is performed by subjecting the strip at each bending point to a series of closely spaced lines of bending.

BERNHARD UNO RYLANDER.

REFERENCES CITED

The following references are of record in the file of this patent:

UNITED STATES PATENTS

| Number | Name | Date |
|---|---|---|
| 1,505,774 | Fitzgerald | Aug. 19, 1924 |
| 1,701,546 | Shaw | Feb. 12, 1929 |
| 1,701,547 | Shaw | Feb. 12, 1929 |
| 1,702,956 | Anderson et al. | Feb. 19, 1929 |
| 2,211,213 | Lindholm | Aug. 13, 1940 |
| 2,231,855 | Stoddard | Feb. 11, 1941 |